Figure 3:
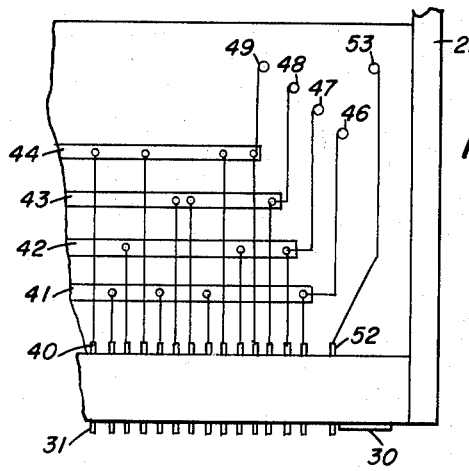

Sept. 14, 1965     P. A. BURGO ETAL     3,206,606
PHOTOSENSITIVE INSPECTION METHOD AND APPARATUS
Filed July 20, 1961     3 Sheets-Sheet 1
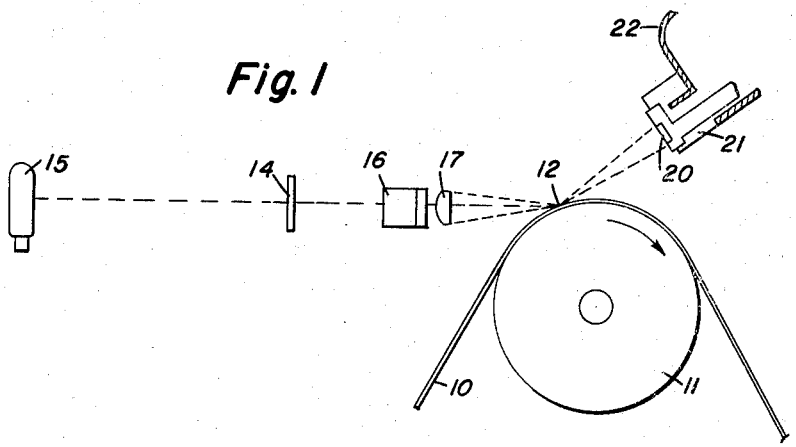
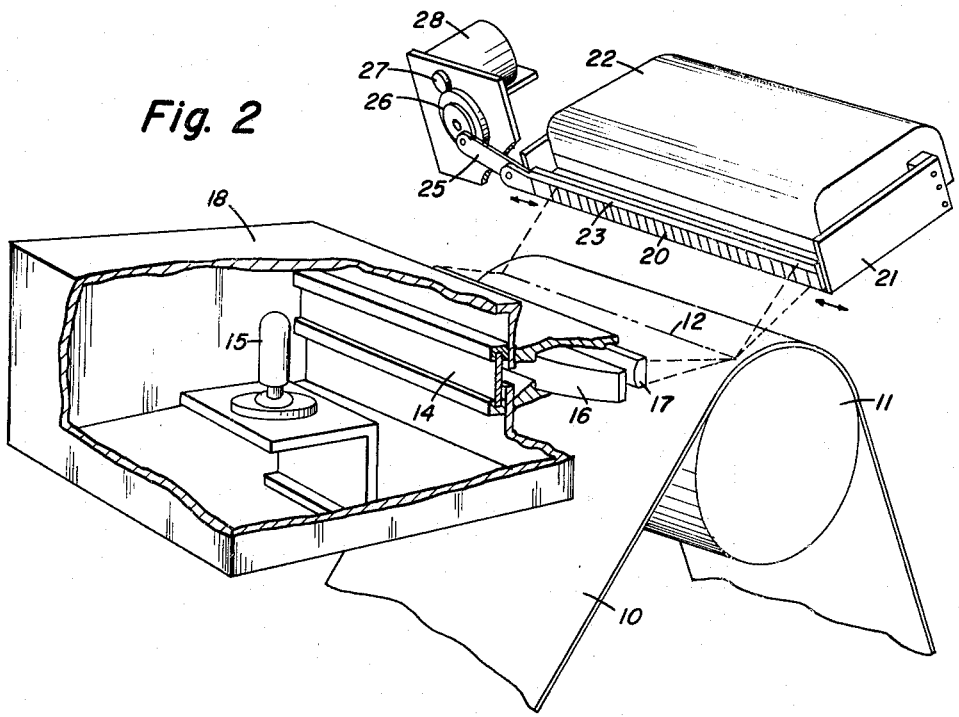
PAUL A. BURGO
JOHN H. JUENGST
ALVIN E. LAKE JR.
INVENTORS
BY R. Frank Smith
F. W. Emerson Holmes
ATTORNEYS Sept. 14, 1965   P. A. BURGO ETAL   3,206,606
PHOTOSENSITIVE INSPECTION METHOD AND APPARATUS
Filed July 20, 1961   3 Sheets-Sheet 2

PAUL A. BURGO
JOHN H. JUENGST
ALVIN E. LAKE JR.
INVENTORS

BY R. Frank Smith
J. M. Emerson Holmes
ATTORNEYS

PAUL A. BURGO
JOHN H. JUENGST
ALVIN E. LAKE JR.
INVENTORS

ATTORNEYS

United States Patent Office 3,206,606
Patented Sept. 14, 1965

3,206,606
PHOTOSENSITIVE INSPECTION METHOD AND APPARATUS
Paul A. Burgo, John H. Juengst, and Alvin E. Lake, Jr., all of Rochester, N.Y., assignors to Eastman Kodak Company, Rochester, N.Y., a corporation of New Jersey
Filed July 20, 1961, Ser. No. 125,530
8 Claims. (Cl. 250—219)

This invention relates to systems for optical inspection by photoelectric means to detect flaws in a moving band. Such systems may be used for marking the defective areas of the band or if the band is subsequently chopped into sheets, for controlling a sorting device to reject the defective sheets. The invention is primarily useful for surface inspection and will be described with reference thereto but is also useful for inspection by radiation transmitted more or less specularly by the specimen under test.

It is an object of the invention to provide a system (apparatus and method) which is sensitive both to specks and to streaks. It is a particular object of the invention to provide an apparatus in which the sensitivity to the two types of defects may be adjusted independently, with a range of adjustment from a low level of sensitivity to one greater than that required for the detection of objectionable defects.

It is an object of the invention to provide a scanning and sensing system which is highly stable and not subject to operation by false signals, that is, by signals other than those corresponding to defects on the band being inspected. The present invention has the high sensitivity necessary for the surface inspection of photographic film and when so used, the invention employs infrared radiation for inspection so as not to expose the film.

One special feature of the invention allows the sensitivity with which the edges of the film strip are scanned or examined to be adjusted independently of the sensitivity over the remaining area of the film. This is useful for various reasons. In the first place, the edges of a strip of film are not as critical as the center since if the edges of the film strip are used at all, they are at the sides of the picture or, in the case of X-ray film, the side edges of the radiograph being taken. Secondly, since the film has normally been slit to the desired width before inspection, the slitting operation may introduce minor defects near the edge of the film and it would not be desirable to reject a film merely because of these edge faults. Thirdly, when scanning a strip of film it is customary to adjust masks corresponding to the edges to be sure that the precise area to be scanned is selected. A change in the area of the photoelectric cell located at the edge by this mask requires an adjustment of the sensitivity of the cell and when making such an adjustment, it is desirable not to interfere with the adjustment already made for the main areas of the film being inspected.

Many scanning systems (including the present invention) illuminate a line or area across which the band to be inspected moves transversely. It is desirable to have this line of light uniform in intensity (or in the case of flying spot scanning, effectively uniform). In the present invention, the optical system which provides this line of light is a fixed one and it is completely enclosed except for the exit face or window which is normally the last surface of a thin cylindrical lens. Thus the lamp, the infrared filter and other optical surfaces are all completely enclosed and can be made and maintained clean so as not to introduce false signals. Also in the preferred embodiments there is no lens or other optical element between the scanning line and the photocells, described below. Thus another possible source of false signals is eliminated.

According to the invention light from juxtaposed areas along the scanning line is received by a row of photoresponsive electric cells such as photoconductive cells which are substantially uniformly and closely spaced. That is, each cell is small and receives light from a tiny area of the band or film. As the band of material to be inspected is moved across the narrow line of radiation, the row of cells is oscillated lengthwise with an oscillating amplitude exceeding the distance between adjacent cell centers.

While some of the light may be diffused, it is substantially specularly received on each cell. Thus at any one moment, eact cell primarily corresponds to, and receives light from a certain one of the areas of the band. According to the invention this correspondence is changed cyclicly (for example by oscillating the cells, or by moving the light source back and forth) from one of said areas to an adjacent area of the strip. This is the feature which provides sensitivity to streaks and which also permits the sensitivity to streaks to be selected more or less independently of the sensitivity to specks.

The oscillating frequency is not critical. It is usually relatively low, say 10 cycles per second. It is preferably not too high since this would introduce mechanical difficulties and is unnecessary for the operation of the invention. The frequency is substantially constant however.

If a speck or other small defect on the film passes through a particular area on the line this introduces a sudden, and hence high frequency, signal in the output of the corresponding cell. If however, a defect in the form of a longitudinal streak occurs on the film this would not produce any A.C. signal on the corresponding cell if the cells remain stationary. The oscillation, which exceeds the effective width of one cell, causes the shadow or bright area produced by the streak to transfer from one cell to the adjacent one. Specks of dirt produce a shadow; shiny spots caused by pressure on the surface cause an increase in the specular reflection. If the streak is several cells wide, the edge of the streak transfers to the next cell. This causes a signal in the total output of all the cells with a frequency equal to that with which the cells are being oscillated.

The particular electric circuits used are not a critical part of the invention but certain preferred arrangements take full advantage of the features provided by the present invention. For one thing, the fact that the frequency of the signals for specks is high and the frequency for a streak is low, permits individual amplification of these signals each with their own selected sensitivity. Thus the system can be made particularly responsive to streaks or to specks as desired.

According to another preferred feature of the circuitry, the cells are connected in groups of cells (preferably an even number say 2, 4, 6 or 8) and one cell from each group is connected into a common electric channel for amplification. This reduces the total number of channels required. When such a system is used, it is preferable not to connect the No. 1 cell of each group to one channel and the No. 2 cell to the second channel etc. In practice, the cells are selected in a logical but irregular pattern so that in the rare instance where a streak type of defect is exactly the width of four cells say, the signal would not cancel itself out in any particular channel but would appear as a negative signal in one channel and a positive signal in another.

In accordance with another preferred feature of the circuitry one-half of the cells are connected to a negative potential and the other half are connected to a positive potential so that stray, external signals, for example those from voltage supply variations or lamp intensity fluctuations which effect all the detector cells simultaneously, will result in no output signal. As a result of this connection signals feeding into the channels may be either positive or negative and the sensitivity of the system will be maintained substantially constant for both types of signal. This does not add complication to the system since the defect signals themselves may be either positive or negative, that is, they may constitute either an increase, due to shininess, or a decrease due to increased optical density of the band of material being inspected.

In general the circuitry has one other special feature but this is not peculiar to the multiple cell or oscillating cell features of the present invention. The additional feature is the fact that the sensitivity of the whole system may be adjusted at will so as not to react to defects which are so minor as to be below the objectionable level, but to react to all defects above this critical level. As mentioned above there is provision for independent adjustment of the sensitivity for specks and streaks. A faint streak is generally more objectionable than a similarly faint speck.

Other objects and advantages will be apparent from the following description when read in connection with the accompanying drawings in which:

FIG. 1 schematically illustrates the optical system employed in the preferred embodiment of the present invention.

FIG. 2 is a perspective view of the essential optical features thereof.

FIGS. 3 to 6 respectively show a top, front, bottom and vertical sectional view of a part of the mount, greatly enlarged, for the photoconductive cells shown in FIGS. 1 and 2.

Figure 7:
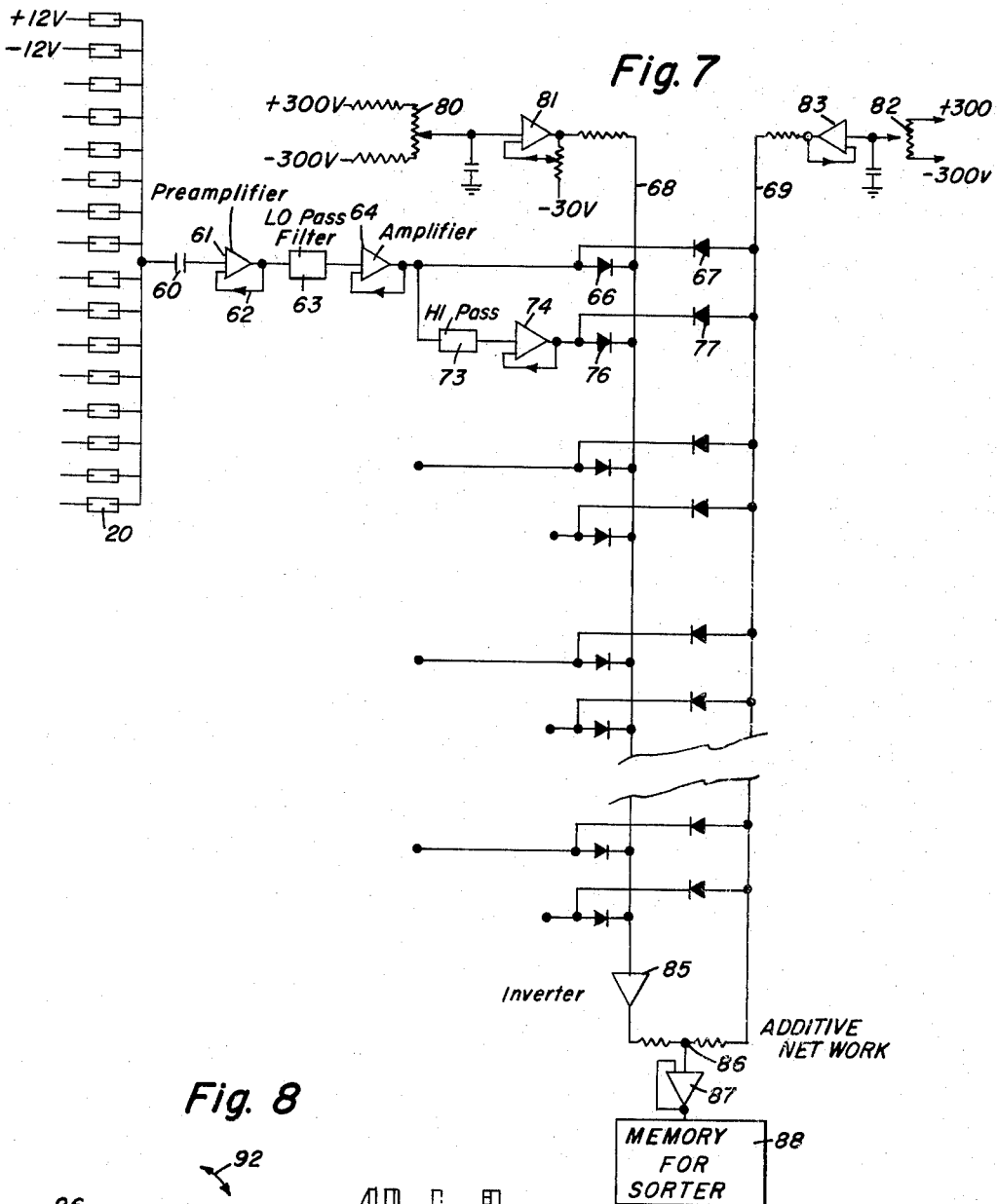

FIG. 7 conventionally illustrates the circuitry operated by the output of the photoconductive cells.

Figure 8:
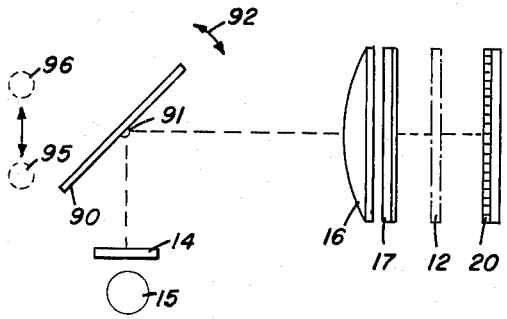

FIG. 8 schematically shows an alternative arrangement of the optical system.

In FIGS. 1 and 2 light from an incandescent lamp 15 is focused by a section of a spherical condenser lens 16 and a narrow cylindrical lens 17 to form a line of light 12 on the surface of a strip of film 10 as it passes over a roller 11. The light is not visible light but is filtered through an infrared filter 14. The light strikes the surface of the film at about 15° (75° to the normal) and the primarily specularly reflected light is received on a row of photoconductive cells 20. These photoconductive cells are infrared sensitive and for example may consist of lead sulfide cells. The light from the lens 16 is substantially collimated so that the sheet of light forming the line 12 is made up of more or less parallel rays slightly converging in the vertical plane. Thus each of the cells 20 receives light primarily from one small area along the line of light 12. In this embodiment the cells are located only one or two inches from the film so that no collecting optics are required and small detector cells can be used. A speck of dust on the film causes a signal even if the shadow of the speck does not completely fill the area of a cell. The resolution of inspection is much finer than the area of the cells.

The row of cells 20 are mounted on a support 23 carried by two cantilevered leaf springs 21 and connected to an eccentric motor drive through an appropriate linkage. An electric motor 28 turns a pinion 27 for driving an eccentric drive 26 which is connected through a link 25 to the end of the row of cells to oscillate them longitudinally with an amplitude greater than the distance between the centers of two adjacent cells and in general, but not necessarily, less than twice this distance. The film 10 moves at fairly high speed over the roller 11; the speed is not critical, although there is a relationship (discussed below) between film velocity, minimum size of speck to be detected and frequency of signal. A defect in the form of a speck causes a sudden darkening of one of the cells which creates a high frequency negative signal (or a high frequency positive signal if the cell happens to be one connected to negative potential); a shiny spot on the film similarly causes an increase of the light on one of the cells. A streak on the film running longitudinally produces a constant intensity in the reflected beam, but since the cells 20 are oscillating longitudinally of themselves, i.e. transversely of the film, this shadow or bright streak moves from one cell to the next which causes a defect signal to be recorded. An oblique streak produces both high and low frequency signals.

In order to avoid the need for separate amplifiers for each cell, they could be connected to a single channel but this would lose the sensitivity to streaks. In a specific example using two cells at each edge, as discussed in more detail below, and 128 cells for the main central scanning (each less than 2 mm. wide and separated by about 0.1 mm.) the cells are connected in groups of four but only one cell from each group is connected with one from each of the other groups to a common channel. Since only the signals caused by change in conductivity are effective, it is not necessary to have perfectly matched cells. They may differ slightly in width, length or sensitivity. It is customary to make them by ruling a photoconductive surface, the ruling being held to a small fraction of a millimeter in width. The number of cells and the grouping are obviously not critical. The number and grouping will depend on the resolution required. The size of the smallest detectable flaw is some fraction of the total width scanned by a single channel. For example, we have found that defects down to .01 inch for bubbles and down to .001 inch for dirt particles can easily be detected when one channel scans an effective total width of one to one and a half inches of film. That is, eight channels can cover about 10 inch wide film. Less critical examination could be provided with fewer channels, i.e. more width per channel. For the sake of reliability, it is customary to choose the least number of channels which will easily give the resolution desired.

Figure 4:
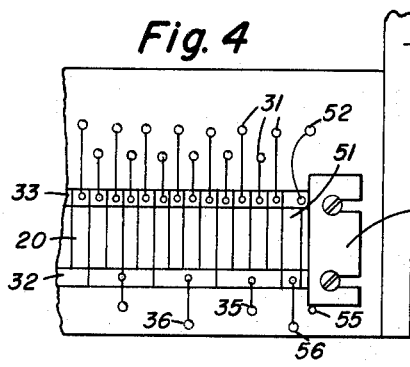
Figure 6:
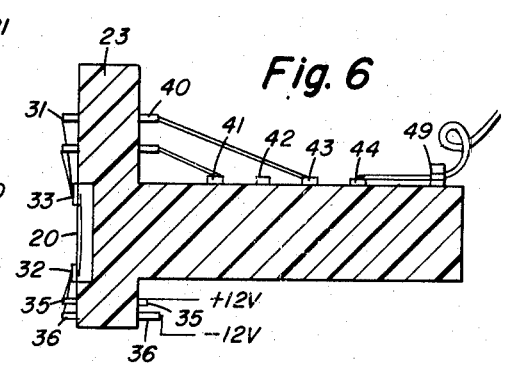
Figure 5:
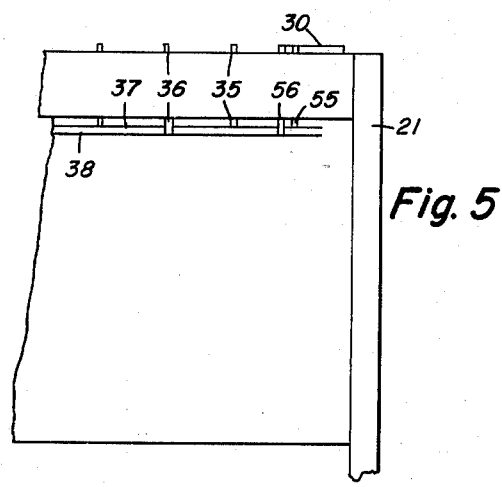

Looking at FIG. 4, it is noted that the cells 20 are vertical in groups of four connected together to electrodes 32 and connected separately to electrodes 33. The common electrodes 32 are connected alternately to posts 35 and 36 which extend through the support block 23. These in turn are respectively connected through wires 37 and 38 to positive and negative potential sources. In the particular example shown, they are connected to +12 volts and −12 volts with respect to ground.

The individual electrodes 33 are connected to posts 31 which also extend through the block to posts 40 on the other side. The block 23 carries bus bars 41, 42, 43 and 44. Connections from the posts 40 to the bus bars are arranged so that one cell, but not the corresponding one, from each group is connected to each bus bar. The irregular pattern of connections is illustrated in FIG. 3 in which the four cells forming the first group on the right are connected in order to the bus bars but successive groups are connected in various orders.

In the total system of 128 cells, there are 8 channels, 4 bus bars for one-half of the film i.e., for 64 cells and four different bus bars for the other half of the film. This means that each channel (corresponding to a bus bar) receives and amplifies the output of 16 cells (aggregate width being about 32 mm.). The bus bars 41–44 are respectively connected to binding posts 46, 47, 48 and 49 from which connections are made to fixed circuits, the connections being flexible to allow for the oscillating movement of the bar 23.

The two end or edge cells 51 are connected to a common post 52 which in turn is connected to binding post 53 and the other ends of the cells 51 are respectively connected to posts 55 and 56 which in turn are connected to the +12 volt and −12 volt potentials discussed above.

One of the cells 51 is masked by a mask 30 whose position is adjustable so that the inspection is confined exactly to the area desired. The amplifier for amplifying the signal from the connecting post 53 is separate from, and is usually at considerably lower sensitivity than, the other amplifiers discussed in connection with FIG. 7 but the output thereof is connected with the output of the other amplifiers to operate whatever mechanism is associated with the scanning system. In this particular case the mechanism is a memory into which the signals are fed for later release to operate a sorter at a fixed distance from the scanning station, along the route of the film through a chopper and sorter. For example the memory and sorting system described in U.S. 2,848,187, Juengst et al., or a standard magnetic shift register memory system may be used. The present invention is not concerned with the particular manner in which the output signals are utilized.

In FIG. 7, sixteen of the cells 20 are connected through a capacitor 60 to a preamplifier 61 with a negative feed back illustrated at 62 to provide stability in the well known way. The signal from the preamplifier 61 is passed through a low pass filter 63 which passes frequencies up to about 2000 c.p.s. and cuts out the extremely high frequencies, which serve no useful purpose in this particular embodiment. The signal is passed through an amplifier 64 and through rectifiers 66 and 67 respectively to output busses 68 and 69. That is, positive signals pass to the bus 68 and negative signals pass to the bus 69. The minimum size defect to be detected and the velocity at which the film 10 moves through the scanning beam, determine the upper frequency which is useful. For example, if the film 10 were moved twice as fast, a filter passing up to 4000 c.p.s. would be used to detect the same minimum size defect.

In order to gain special sensitivity for the high frequency caused by specks and similar small defects, part of the output from the amplifier 64 is passed through a high pass filter 73 for further amplification by an amplifier 74. The signals from this amplifier are passed through rectifiers 76 and 77 to the output busses 68 and 69. This high pass filter 73 in combination with the low pass filter 63 transmits to the amplifier 74 a band of frequencies above 1000 c.p.s. and centered near 2000 c.p.s.

The other 8 channels, the output stages of four of which are illustrated in FIG. 7, also supply signals to the output busses 68 and 69. The sensitivity of the system to positive signals through the output bus 68 is adjusted by potentiometer 80 and amplifier 81 which determines the potential on the bus 68. Any signal which is lower than a critical potential thus adjusted, becomes ineffective but any signal greater than this selected minimum, is effective. Thus the circuit 80, 81 is an amplitude discrimination circuit, passing only high amplitude signals. A typical defect signal from a 16 cell array channel is about 5 mv. and the output from the preamplifier 61 of the transistor type with high negative feed back, is about 0.5 volt, a gain or amplification of 100.

The amplifier 64 having an open loop gain of about 15,000 also has high negative feed back to produce reliability so that the effective amplification shows a gain of six bringing the signal up to about 3 volts. The rectifiers 66 and 67 are typically silicon diodes.

The bias and hence the sensitivity of the output bus 69 is similarly adjusted through a variable potential source 82 and amplifier 83. A standard defect signal such as created by passing a wire of a particular size through the light beam of the scanning system can be used to test the sensitivity of the system at the time of adjustment of the potentiometers 80 and 82. The ouput of the bus 68 is passed through an inverter 85 which is simply an amplifier operating with unit amplification and is combined through an additive network 86 with the output of the bus 69 and fed through a further stage of amplification 87 to the memory 88 of a sorter or other signal responsive means. The signal from the inspection station could be used in any of the known ways to label a defective area or to reject a sheet having a defect.

In FIG. 8 the radiation from the lamp 15 after it passes through the infrared filter 14 is reflected by a plane front surface mirror 90 before it passes through the lens 16 and 17 to illuminate the inspection strip 12 on the film. As before the light is collimated by the lens 16 in the horizontal plane of the drawing and after it strikes the film (at the test area 12) it is substantially specularly reflected to the row of photoelectric cells 20, which in this embodiment remain stationary. The mirror 90 is pivoted at the point 91 and is oscillated as indicated by the double headed arrow 92, by means such as a rotating cam or solenoid, not shown. This oscillation causes the virtual image of the lamp seen in the mirror 90 to move between the positions indicated at 95 and 96. The parallel light striking the area 12 thus changes its angle of incidence in the horizontal plane and thus the light from one area of the strip 12 oscillates angularly and is received cyclicly by the adjacent cells of the row 20. The cells "see" (i.e. receive light from) different areas and the change to adjacent areas is cyclic. The distance of the cells from the test area 12 determines the amplitude of the cyclic change. Still another way of providing the cyclic relationship of test areas and cells would be to hold both the light source and the cells fixed and to oscillate the film transversely, but this obviously is a complicated and less preferred system.

Having thus described preferred embodiments of our invention we wish to point out that it is not limited thereto but is of the scope of the appended claims.

We claim:

1. In an optical inspection device the combination of means for moving a band of material to be inspected across a narrow line of radiation, a substantially uniformly and closely spaced row of photo-responsive electric cells positioned to receive light respectively from juxtaposed areas along said line, means for oppositely electrically biasing cells receiving light from alternate areas along said line, means for oscillating the row lengthwise with an oscillation amplitude exceeding the distance between adjacent cell centers, a plurality of the cells having a common electric output and signal responsive means connected to and operated by signals in said output.

2. An optical scanning system comprising means for moving a band of material to be inspected across a narrow line of radiation, a row of photoresponsive electric cells, closely and substantially uniformly spaced along a line parallel to said line of radiation, said cells being positioned to receive light respectively from a corresponding row of areas along the line of radiation, means for oppositely electrically biasing alternate cells along said row, means for oscillating the row of cells lengthwise with a substantially constant frequency and with an oscillation amplitude exceeding the distance between adjacent cell centers, a plurality of the cells having a common electric output and signal responsive means connected to and operated by signals in said output.

3. A system according to claim 2 in which said common output includes two circuits, one selectively responsive to frequencies on the order of said oscillation frequency and the other selectively responsive to a higher band of frequencies.

4. A system according to claim 2 in which the row of cells is divided into sections each containing a plurality of cells and in which there is a plurality of electric channels each with its own output and each connected to a plurality of cells, but not to more than one in each section.

5. A system according to claim 2 in which there is an even number of cells, half of them connected across a negative potential input and the other half across a positive potential input.

6. The method of inspecting a moving band to detect streaks therein which comprises receiving light substantially specularly from juxtaposed band areas in a line transverse to the band on separate photoresponsive elements each of which receives light primarily from an area with which it is in correspondence at any one moment and produces a signal proportional to a change in the light received thereon, cyclicly changing the correspondence of the elements to adjacent areas and back again and in a common output from elements corresponding to two adjacent areas, combining the signals subtractively relative to one another.

7. The method of inspecting a band of material to detect longitudinal streaks therein which comprises moving the band across a row of juxtaposed band areas, receiving light substantially specularly from the band in each area on one of a corresponding number of photoresponsive elements respectively in correspondence with the areas and which produces a signal proportional to a change in the light received thereon, cyclicly changing the correspondence of the elements from their areas to adjacent areas and back again and in a common output from elements corresponding to two adjacent areas, combining the signals subtractively relative to one another.

8. The method of inspecting a band of material to detect longitudinal streaks therein which comprises moving the band across a row of juxtaposed band areas, receiving light substantially specularly from the band in the areas on a corresponding number of photoresponsive elements, each element receiving light from one area with which said element is in correspondence at any one time and producing a signal proportional to a change in the light received thereon, amplifying as one signal, the total output of a plurality of such elements, not adjacent to each other and not uniformly distributed in the row and cyclicly oscillating transversely of the band and relative to each other, the areas and the elements.

References Cited by the Examiner
UNITED STATES PATENTS

| | | | |
|---|---|---|---|
| 2,624,848 | 1/53 | Hancock et al. | 250—234 X |
| 2,892,951 | 6/59 | Lenderman | 250—219 |
| 2,933,612 | 4/60 | Cheverton et al. | 250—235 |
| 2,939,963 | 6/60 | Rideout | 250—219 |
| 2,968,988 | 1/61 | Crosfield | 250—234 X |
| 3,102,203 | 8/63 | McNaney | 250—209 |

RALPH G. NILSON, *Primary Examiner.*

WALTER STOLWEIN, *Examiner.*